INVENTOR
ELWOOD GREENE
BY Donald H. Zarley
ATTORNEY

3,185,118
CORN PLANTER SIGNALING MEANS
Elwood Greene, 1115 SW. Summer, Humboldt, Iowa
Filed Sept. 9, 1963, Ser. No. 307,464
3 Claims. (Cl. 111—51)

This invention relates to a corn planter and in particular to a signaling means for indicating to the operator that the machine is operating.

Corn planters in use today are capable of being operated at speeds of up to seven miles per hour. At these speeds, the operator has a full time job in just driving the tractor on the marked course. Therefore he is unable to observe the operation of each of the individual planter shank valves to note whether or not they are functioning properly. Should one planter shank valve malfunction, it might be many minutes before the operator would realize the problem and take steps to correct it. Heretofore, however, planter designs did not permit the fast forward movement and therefore the operator could drive the tractor and still maintain reasonable surveillance of the planter's operation.

Therefore, it is an object of this invention to provide a corn planter having a signaling means which will indicate to the operator whether the planter shank valves are operating properly;

It is a further object of this invention to provide a signaling device for a corn planter which will be actuated periodically under normal operating conditions;

It is a further object of this invention to provide a signaling device for corn planters having split-second valves which use a special chain with small flights (much like a farm elevator) to carry the seed from the hopper down to the soil; and A further object of this invention is to provide a corn planter signaling means which is simple in design, economical to manufacture and refined in appearance.

This invention consists in the construction, arrangements, and combination, of the various parts of the device, whereby the objects contemplated are attained as hereinafter more fully set forth, specifically pointed out in the claims, and illustrated in the accompanying drawings, in which:

Figure 1:
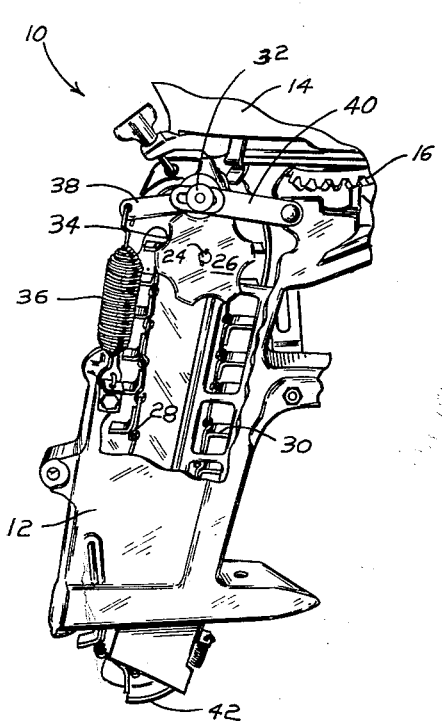
FIG. 1 is a fragmentary side view of a corn planter shank with a portion of the shank cut away to more clearly illustrate the internal moving components.

In the drawings, only one of the planter shanks is illustrated as the rest of the planter is conventional and not to be considered a part of the present invention. Mechanical power may be supplied by the planter transport wheels to a drill shaft which drives the seed plate associated with each planter shank and a valve sprocket which in turn drives each of the flight conveyors in the individual planter shanks.

As shown in FIG. 1, the planter shank is referred to generally by the reference numeral 10 and includes a hollow housing 12. A seed hopper 14 is carried at the top of the planter shank 10 and includes a seed plate sprocket 16.

The drill shaft (not shown) which drives the seed plate and the flight conveyor, is coupled to a pinion sprocket 18 (FIG. 2), which in turn through a chain 20 drives a valve sprocket 22. The valve sprocket 22 is fixedly secured to a shaft 24 which extends through the shank housing 12 and is fixedly secured to a cam 26 (FIG. 1) on the other side of the housing 12. Intermediate the cam 26 and the sprocket 22 the shaft 24 drives a conveyor 28 having flights or paddles 30. A roller 32 maintains constant contact with the undulations 34 in the outside peripheral surface of the cam 26 due to the spring 36 holding the roller 32 in contact with the cam 26. Spring 36 is secured at one end to the housing 12 and the other end to an arm 38 which in turn has its other end formed with a slot through which the roller 32 is permitted to move. A second arm 40 has a similar slot formed in one end for receiving the roller 32 while the other end of the arm 40 is pivotally secured to the housing 12. By the use of the roller cam arrangement, it is possible to momentarily stop the flight conveyor 28 to receive corn from the seed plate in the correct and desired amount. Since, as above indicated, the flight conveyor 28 and the seed plate are both driven by the drill shaft it is possible to coordinate their operation.

As corn is delivered by the conveyor 28 to the lower end of the housing 12, the flights 30 frictionally engage the lower valve 42 to pivot it to an open position for release of the corn into the ground. As the valve 42 is disengaged by a particular flight member 30, it is closed until it is contacted by the next paddle 30.

Figure 2:
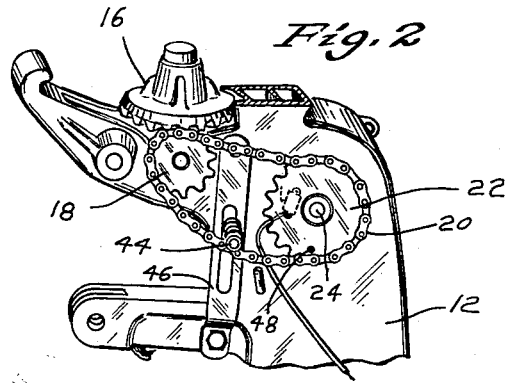
FIG. 2 is a fragmentary side elevation view from the opposite side of the planter shank as viewed in FIG. 1.

Referring now to FIG. 2, it is seen that a chain idler 44 is provided for engagement with the chain 20 to maintain the desired tension in the chain which couples the pinion sprocket 18 to the valve sprocket 22. The chain idler 44 is adjustable on the bracket 46 which is secured to the housing 12.

Figure 3:
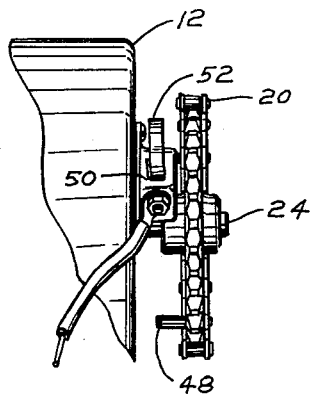
FIG. 3 is a fragmentary front elevation view of the shank valve sprocket and also showing in particular the micro switch mounted on the shank housing.

In FIG. 3, a pin 48 is seen positioned near the outer periphery of the valve sprocket 22 and extends parallel to the shaft 24 towards the housing 12. A micro switch 50 is fixedly secured to the outer housing 12 sidewall adjacent the sprocket 22 and is provided with a leaf spring 52 positioned to engage the pin 48 once during each revolution of the valve sprocket 22.

Figure 4:
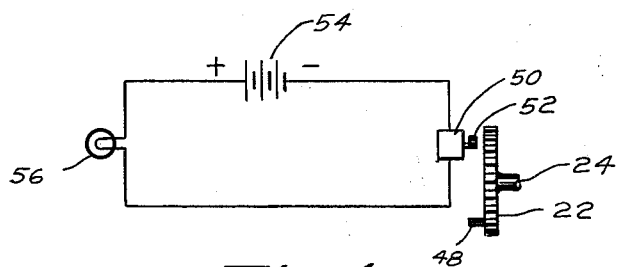
FIG. 4 is a schematic drawing of the electrical circuitry of the planter signaling means.

As shown in FIG. 4, the micro switch 50 is connected in series to a battery 54 connected in series with a light 56 which in turn is connected to the other terminal of the switch 50. Light means 56 may be conveniently positioned on the tractor within the view of the operator.

The micro switch 50 is normally open and thus in operation, the revolution of the valve sprocket 22 will cause the pin 48 to close the switch 50 by engagement with the leaf spring 52 and thereby close the circuit illustrated in FIG. 4 whereupon the light 56 will be lit. By positioning the switch 50 and pin 48 in the position described relative to the seed flight conveyor 28 and the drill shaft, positive indication is given to the operator of the planter as to the operating condition of each individual planting mechanism. It has been found that a flashing intermittent signaling light is superior for purposes of warning the operator of the planter that the planter is functioning properly than a light which remains on at all times during normal planter operation. The driver tends to take for granted a light which remains on at all times and it has been found will not notice the lack of illumination should the planter fail to operate using that type of indicating system. This is especially true when operating the planter in the daytime when an artificial light is ordinarily hard to see. Conversely, if a blinking light as provided in this invention, ceases operation it will be noticed immediately by the operator.

From a consideration of the foregoing disclosure, it will be obvious that all of the initially recited objects of the present invention have been achieved.

Some changes may be made in the construction and arrangement of my corn planter signaling means without departing from the real spirit and purpose of my invention, and it is my intention to cover by my claims, any modified forms of structure or use of mechanical equivalents which may be reasonably included within their scope.

I claim:
1. In a corn planter, comprising in combination,
a hollow shank member,
a shaft extending through the upper end of said shank member,
a valve sprocket on one end of said shaft, adjacent the exterior of one side of one side of said shank member,
a drill shaft operatively connected to said valve sprocket,
a chain flight conveyor in said shank connected to said shaft,
a pin element positioned on the inside of said valve sprocket and extending towards said shank,
a normally open micro switch mounted on said shank and having a trigger means disposed in the path of said pin element for engagement with said pin element once each revolution of said valve sprocket,
said switch being closed during contact with said pin element,
and an electrical power supply and light means coupled to said switch whereby said light means is lit when said switch is closed.

2. The structure of claim 1 wherein said light means is located on the prime mover for the planter forwardly of the operator whereby the operator may observe the light means without taking his eyes off the line of travel.

3. In a corn planter, comprising in combination,
a hollow shank member,
a shaft extending through the upper end of said shank member,
a valve sprocket on one end of said shaft, adjacent the exterior of one side of said shank member,
a drill shaft operatively connected to said valve sprocket,
a chain flight conveyor in said shank connected to said shaft,
a cam wheel mounted on said shaft adjacent the other side of said shank member, said cam wheel being provided with a plurality of undulations around its periphery,
a roller spring biased into engagement with the periphery of said cam wheel,
a pin element positioned on the inside of said valve sprocket and extending towards said shank,
a normally open micro switch mounted on said shank and having a trigger means disposed in the path of said pin element for engagement with said pin element once each revolution of said valve sprocket,
said switch being closed during contact with said pin element,
and an electrical power supply and light means coupled to said switch whereby said light means is lit when said switch is closed, and
said light means is located on the prime mover for the planter forwardly of the operator whereby the operator may observe the light means without taking his eyes off of the line of travel.

References Cited by the Examiner

UNITED STATES PATENTS

| | | | |
|---|---|---|---|
| 658,348 | 9/00 | Crowley | 111—51 |
| 2,441,185 | 5/48 | Brown et al. | 340—271 X |
| 2,907,015 | 9/59 | Young | 111—34 X |

ABRAHAM G. STONE, *Primary Examiner.*